Oct. 3, 1933.　　　G. H. BARSCHOW　　　1,928,807
CHILD'S VEHICLE
Filed May 16, 1932　　　2 Sheets-Sheet 1

Inventor
George H. Barschow.
By Owen & Owen
Attorneys

Oct. 3, 1933.　　　　G. H. BARSCHOW　　　1,928,807
CHILD'S VEHICLE
Filed May 16, 1932　　　2 Sheets-Sheet 2
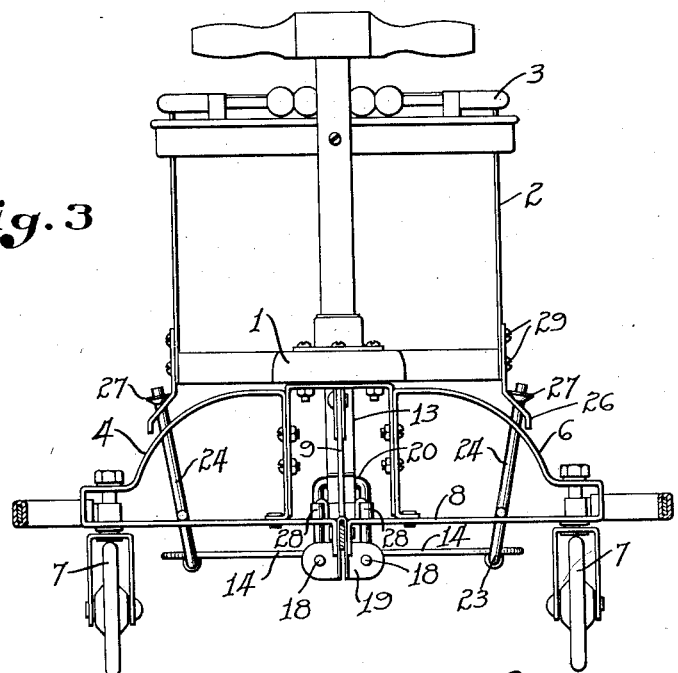
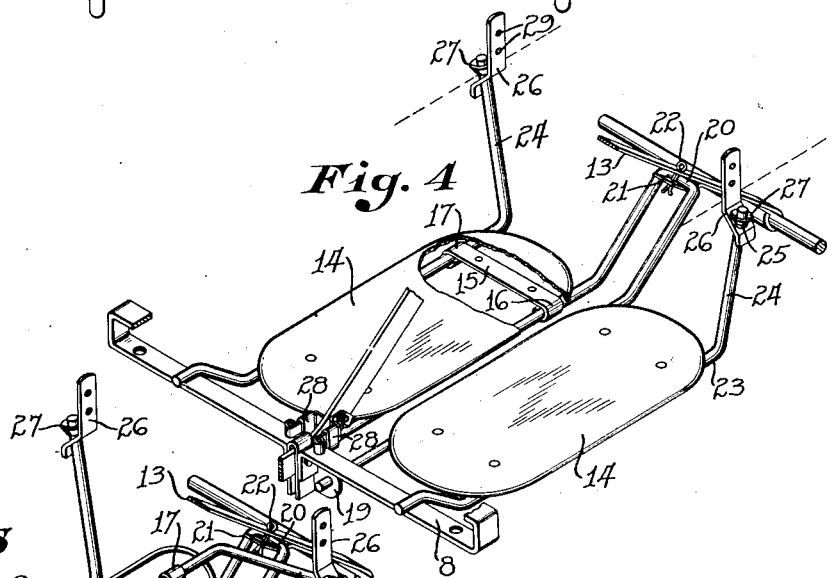
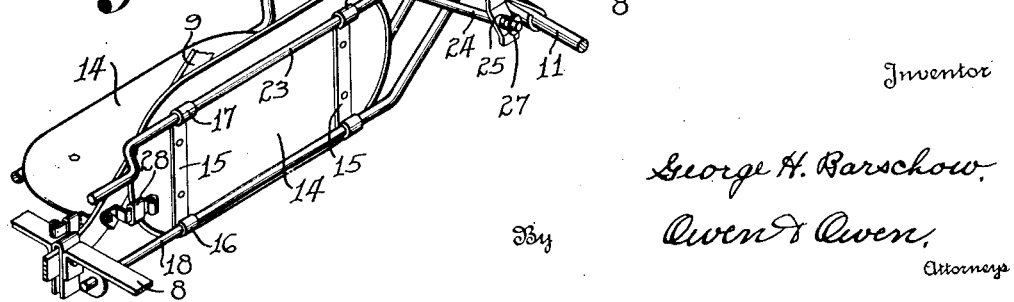
Inventor
George H. Barschow.
By Owen & Owen,
Attorneys Patented Oct. 3, 1933

1,928,807

UNITED STATES PATENT OFFICE 1,928,807

CHILD'S VEHICLE

George H. Barschow, Toledo, Ohio, assignor to The American-National Company, Toledo, Ohio, a corporation of Ohio Application May 16, 1932. Serial No. 611,535

13 Claims. (Cl. 155—22)

This invention relates to children's vehicles of the straddle-board or baby-walker type, and particularly to foot-boards for use in connection with such vehicles for supporting the feet of the occupant when the vehicle is being used as a push or pull cart for the child.

The object of the invention is the provision of a novel foot-rest structure for vehicles of the class described, which is permanently attached to the vehicle, at least during the period in which the vehicle is interchangeably used both as a baby-walker and as a push or pull cart, and which is capable of easy and quick adjustment to either operative or inoperative positions as desired, and which, when in use, provides a firm support or platform on which the child may stand.

The invention is fully described in the following specification, and while in its broader aspect it is capable of embodiment in different forms, one embodiment thereof is illustrated in the accompanying drawings, in which—

Figure 1:
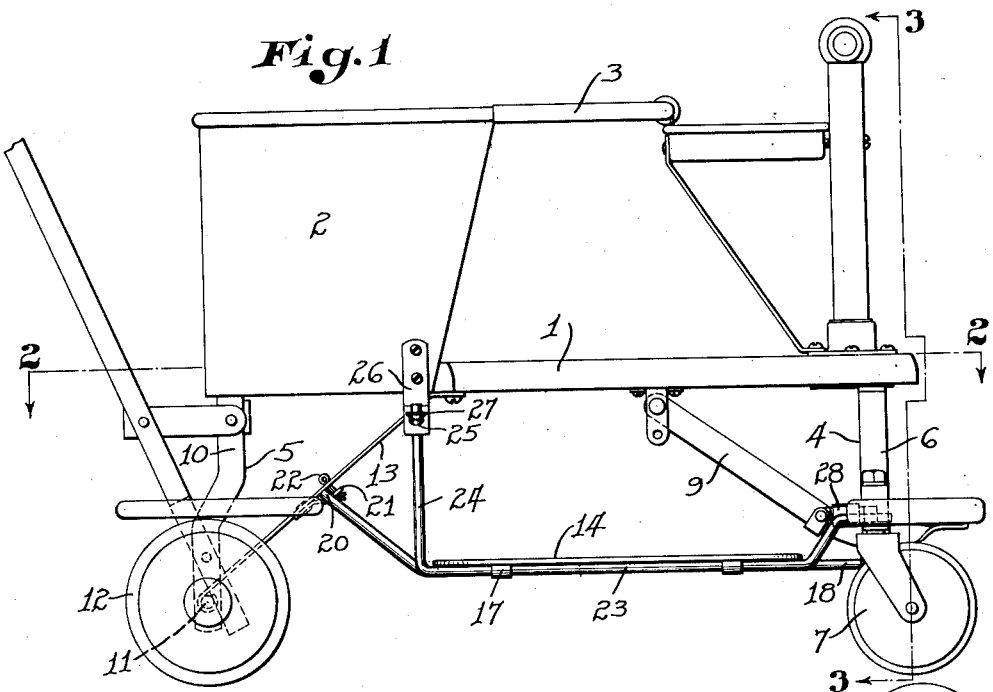
Figure 2:
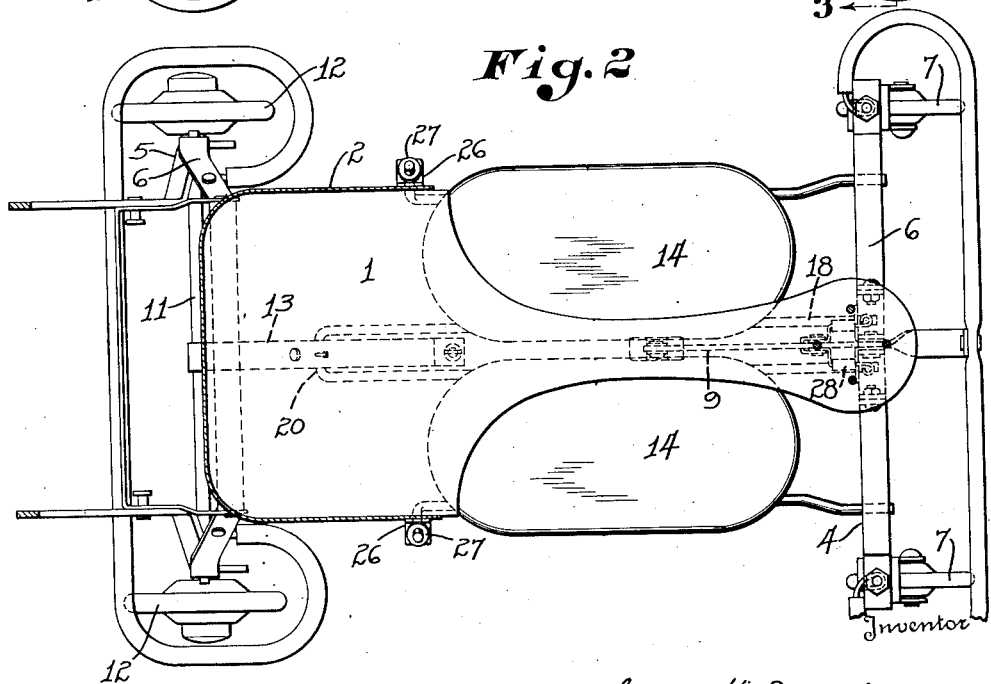

Figure 1 is a side elevation of a vehicle of the baby-walker type equipped with the novel foot-board structure and with the foot-board in usable position. Fig. 2 is a top plan view thereof with parts in section on the line 2—2 in Fig. 1. Fig. 3 is a front end elevation thereof taken on the line 3—3 in Fig. 1, with parts in section. Fig. 4 is a perspective view of the foot-board and the mounting attachments of the vehicle with parts broken away and with the foot-board in usable position, and Fig. 5 is a similar view with one member of the foot-board in folded position.

Referring to the drawings, 1 designates the seat or straddle-board of a vehicle of the baby-walker type, 2 the seat-back with its retaining ring 3, customarily mounted on the seat-board when the vehicle is being used as a baby-walker, and 4 and 5 the respective front and rear wheeled supports for the seat-board.

The front support 4 comprises a bolster frame 6 carrying the two laterally spaced casters or swivel wheels 7 at its ends and having a horizontally disposed cross-bar or member 8 disposed at the lower portion of the frame. The frame 6 is braced relative to the seat-board by a rearwardly and upwardly extending bar 9 attached at its lower forward end to the center of the cross-bar 8 and at its upper rearward end to the underside of the seat.

The rear support 5 comprises the bolster frame 10 carrying the rear axle 11, on the ends of which are mounted the wheels 12. A brace-bar 13 extends upward and forward from the central portion of the axle 11 and is attached at its forward end to the underside of the seat-board. Nothing novel is claimed for the construction of the vehicle so far described, as such construction is common to vehicles of this character.

The foot-board structure of the vehicle in which the present invention resides comprises the two duplicate foot-rest plates or members 14, 14, of a suitable stiff material, such for instance as sheet metal, one of which is mounted below the seat-board 1 at each side of the longitudinally extending vertical center thereof in position to support the respective foot of a child sitting on the seat-board and straddling its narrow forwardly extending portion. Each foot-rest member is of a size to preferably extend at its outer edge at least to a line extended forwardly from the respective side edge of the broad seat portion of the seat-board with the rear end of the member extending a distance under the seat portion of the board and with its inner edge extending under the narrow straddle portion of the board, as best shown in Fig. 2. It will, of course, be understood that the size and shape of the foot-rest members 14 may be varied to suit the particular needs in hand.

Each foot-rest member 14 is provided, in the present instance, at its underside with longitudinally spaced cross-pieces 15 of strap, or similar metal, to give strength to the foot-rest and at the same time to provide bearing loops 16 and 17 at the inner and outer ends thereof, respectively. The inner loops 16 receive and have a pivotal bearing on a respective rearwardly extending horizontal rod 18, one being provided, in the present instance, for each foot-rest member, such rod having its forward end mounted in a respective bracket or bearing ear 19 secured substantially centrally to the cross-bar 8 at the underside thereof, as best shown in Figs. 3, 4 and 5. The rear end portion of each rod 18 is turned upwardly and rearwardly at a point beyond the points of bearing for the loop 16, and is attached at its rear end to the rear brace-bar 13. In the present instance, the two pivot rods 18, 18, comprise the parallel leg portions of a U-shaped member, the loop portion 20 of which is provided at the rear end of the member and is in hooked engagement with an upwardly projecting hooked-finger 21 secured to the forward side of the brace-bar 13. The looped end of the member 18, 20, is releasably retained in engagement with the hooked finger 21 by a cotter pin 22.

The outer set of bearing loops 17 of each foot-rest member 14 pivotally receive a supporting rod 23 extending lengthwise of the foot-rest member and projecting at its ends beyond each end of such member. The forward end of the rod 23 is adapted to project over and to rest on the cross-bar 8 of the front bolster frame 4, and such end is slightly offset from the foot-rest engaging portion of the rod to adapt the foot-rest to lie in a lower horizontal plane than said cross-bar when the foot-rest is in usable position, as shown in Figs. 1 to 4. Each rod 23 is provided at its rear end with a laterally extending arm 24, which projects upwardly, when the associated foot-rest member is in usable position, through an eye 25 provided in a bracket 26, which is secured to the respective side edge of the seat portion of the seat-board 1. The suspending arm 24 has a button or shoulder 27 on its free end which engages the upper side of the bracket arm and cooperates with the cross-bar 8 to limit the lowering movement of the associated foot-rest member. When a foot-rest member 14 is swung upwardly to inoperative position, the suspending arm 24 of the supporting rod 23 swings to horizontal position, as shown in Fig. 5, and such arm has free pivotal movement combined with reciprocatory movement in the bearing eye of its bracket-arm 26.

When the two foot-rest members 14 are swung to vertical or inoperative position, they lie in close parallel relation beneath the narrow straddle portion of the seat-board longitudinally thereof. When the foot-rest members are in this position, they are compactly disposed beneath the seat-board and do not in any way interfere with the free use of the child's feet in operating the vehicle as a baby-walker. Each foot-rest member is retained in folded position beneath the seat-board by a latch finger 28, which is pivoted to the respective side of the front brace-bar 9, and is adapted to be swung into or out of holding engagement with the foot-rest member.

It is apparent that the foot-rest structure embodying the invention may be removed as a unit from the vehicle by simply removing the cotter pin 22 to permit the looped end of the bearing member 18, 20, to be released from engagement with the hooked finger 21, and by removing the screws 29 which secure the bracket-arms 26 to the seat-board, after which the forward ends of the pivot rods 18 may be withdrawn from engagement with the openings in the supporting ears 19. It is also apparent that the foot-rest members of this structure can be easily and quickly thrown from operative to inoperative position by merely applying a raising pressure to the outer edge portion of the respective member 14, and such members can then be quickly secured in inoperative position by throwing the latch fingers 28 from the position shown in Figs. 1 and 4 to that shown by the right hand catch finger in Fig. 5.

The foot-structure, when in use, provides a very rigid and strong foot-support due to the supporting of the foot-rest members at both front and back at the inner and outer edges thereof.

I wish it understood that my invention is not limited to any specific construction, arrangement or form of the parts, as it is capable of numerous modifications and changes without departing from the spirit of the claims.

What I claim as new, and desire to secure by United States Letters Patent, is:

1. In a vehicle of the class described, a seat-board of the straddle type, a foot-rest member, a pivotal support for said member beneath the straddle portion of the seat-board permitting transverse swinging movements of the member from usable reclining position to upright inoperative position, the swinging axis of said member extending lengthwise of the straddle portion of the seat-board and means cooperating with the pivotal support to support the member in usable position.

2. In a vehicle of the class described, a seat-board of the straddle type, a foot-rest member, a pivotal support for the inner edge portion of said member disposed beneath the straddle portion of the seat-board lengthwise thereof and permitting transverse swinging movements of the member from reclining usable position to upright inoperative position, and means attached to the outer edge portion of the member to coact with portions of the vehicle to support said portion of the member in usable position.

3. In a vehicle of the class described, the combination with the seat-board and front and rear supports thereof, of a pivot member mounted lengthwise of said board beneath the central portion thereof, a foot-rest carried at its inner edge for transverse swinging movements by said pivot member, supporting means attached to the outer edge portion of the foot-rest to coact with the seat-board and front support therefor to support the foot-rest in reclining usable position.

4. In a vehicle including a seat-board of the straddle-type and, a pair of foot-rest members mounted side by side transversely of the seat-board beneath the same and pivoted to be swung toward each other to inoperative position beneath the seat-board, the swinging axes of said members disposed lengthwise of the seat-board in the vertical plane thereof.

5. In a vehicle including a seat-board of the straddle-type and a pair of foot-rest members mounted side by side transversely of the seat-board beneath the same and pivoted to be swung toward each other to inoperative position beneath the seat-board, the swinging axes of said members disposed lengthwise of the seat-board in the vertical plane thereof, and releasable means for retaining the foot-rest members in inoperative position.

6. In a vehicle of the class described, a pair of foot-rest members mounted at their inner edges beneath the seat-board of the vehicle for transverse swinging movements to permit them to be placed in upright inoperative position beneath the straddle portion of the seat-board, and means cooperating with parts of the vehicle to support the outer edge portion of each member in usable position.

7. In a vehicle of the class described, a pivotal means supported by the vehicle beneath and lengthwise of its seat-board, a pair of foot-rest members disposed side by side transversely of the seat-board and pivotally supported at their inner edges by said means for swinging movements from reclining usable position to inoperative position beneath the seat-board, and means coacting with the outer edge portions of said members and with parts of the vehicle to support the members in usable position.

8. In a vehicle of the class described, a pivot member disposed beneath and lengthwise of the vehicle seat-board and supported at front and back by parts of the vehicle, a foot-rest hingedly attached at one edge to said pivot member for swinging movements transverse to the vehicle to adapt it to be placed in upright inoperative position or in reclining usable position, and a rod pivotally connected to the outer edge portion of the foot-rest and having its opposite ends in supporting engagement with parts of the vehicle when the foot-rest is in usable position.

9. In a vehicle of the class described, the combination with a seat-board and front and rear supports therefor, of a foot-rest having one edge pivotally mounted beneath the straddle portion of the seat-board for transverse swinging movements to adapt the foot-rest to be placed in upright inoperative position beneath the seat-board, and a supporting member attached to the outer edge portion of the seat-board and having its forward end resting on a part of said front support and its rear end suspended from the adjacent portion of the seat-board to support the foot-rest in usable reclining position.

10. In a vehicle of the class described, the combination with a seat-board having a seat portion and a narrow straddle portion, and front and rear supports for the seat-board, of a foot-rest member pivotally mounted at one edge beneath the straddle portion of the seat-board for transverse swinging movements relative thereto permitting it to be placed in upright inoperative position beneath the seat-board, a bracket attached to the seat portion of the seat-board, and a supporting rod pivotally attached to the outer edge portion of the foot-rest member lengthwise thereof and having one end adapted to coact with said front support and its upper end extending upward and coacting with said bracket to support the foot-rest member in usable position, said rear end of said supporting rod having sliding pivotal connection with said bracket to permit swinging movements of the foot-rest.

11. In a vehicle of the class described, the combination with the seat-board, and the front and rear supports therefor, of a detachable foot-rest unit comprising a pivotal support extending beneath and lengthwise of the central portion of the seat-board and detachably connected at front and rear to adjacent portions of the vehicle, a pair of foot-rest members pivoted at their adjacent inner edges to said pivotal support to adapt said members to be swung upward and inward toward each other to inoperative position beneath the foot-board, and a cooperating support attached to the outer edge portion of each foot-rest member and coacting with portions of the vehicle at front and rear of the foot-rest members to support them in usable position.

12. In a vehicle including a seat-board of the straddle type and a foot-rest member, means mounting said member beneath said seat-board for movements to permit it to be placed in reclining usable position beneath the straddle portion of the seat-board, or in upright non-usable position beneath the straddle portion of the seat-board and lengthwise of said straddle portion and of the vehicle so that the legs of a child using the vehicle straddle both the seat-board and the foot-rest member.

13. In a vehicle including a seat-board of the straddle type and a pair of foot-rest members, means mounting said members beneath said seat-board for movements to permit them to be placed in reclining usable position below the plane of the straddle portion of the seat-board or in upright non-usable position beneath the said straddle portion and lengthwise of both it and the vehicle to permit a child using the vehicle to straddle both the seat-board and the foot-rest members, and means for retaining the foot-rest members in upright non-usable position.

GEORGE H. BARSCHOW.